(12) United States Patent
Johnson et al.

(10) Patent No.: US 9,283,913 B2
(45) Date of Patent: Mar. 15, 2016

(54) SEAT BELT SYSTEM

(71) Applicant: TRW Vehicle Safety Systems Inc., Washington, MI (US)

(72) Inventors: Kenneth R. Johnson, Clinton Township, MI (US); Paul J. Rozan, Chesterfield, MI (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 0 days.

(21) Appl. No.: 13/781,833

(22) Filed: Mar. 1, 2013

(65) Prior Publication Data
US 2014/0246845 A1 Sep. 4, 2014

(51) Int. Cl.
*B60R 21/18* (2006.01)
*B60R 22/18* (2006.01)

(52) U.S. Cl.
CPC .................. *B60R 21/18* (2013.01); *B60R 22/18* (2013.01); *B60R 2022/1806* (2013.01)

(58) Field of Classification Search
CPC .. B60R 21/18; B60R 22/18; B60R 2022/1806
USPC ........... 280/733, 736, 740, 801.1, 801.2, 807, 280/808; 180/268; 297/468, 470, 471, 473
See application file for complete search history.

(56) References Cited

U.S. PATENT DOCUMENTS

| | | | |
|---|---|---|---|
| 3,791,670 A | 2/1974 | Lucore et al. | |
| 5,385,367 A * | 1/1995 | Tanaka | B60R 21/18 280/733 |
| 5,390,953 A | 2/1995 | Tanaka et al. | |
| 5,839,753 A | 11/1998 | Yaniv et al. | |
| 6,019,388 A * | 2/2000 | Okazaki et al. | 280/733 |
| 6,142,512 A * | 11/2000 | Suyama | 280/733 |
| 6,168,195 B1 * | 1/2001 | Okazaki et al. | 280/733 |
| 6,168,196 B1 * | 1/2001 | Nariyasu | 280/733 |
| 6,471,243 B1 | 10/2002 | Brown | |
| 6,533,315 B2 | 3/2003 | Brown et al. | |
| 6,591,465 B2 * | 7/2003 | Suyama | A44B 11/2515 24/633 |
| 6,883,829 B2 * | 4/2005 | Suyama et al. | 280/736 |
| 7,222,880 B2 * | 5/2007 | Goto et al. | 280/740 |
| 7,748,735 B2 | 7/2010 | Itoga | |
| 7,758,070 B2 * | 7/2010 | Katsuda et al. | 280/736 |
| 8,317,222 B2 * | 11/2012 | Arnold et al. | 280/733 |
| 2003/0015863 A1 * | 1/2003 | Brown et al. | 280/733 |

(Continued)

FOREIGN PATENT DOCUMENTS

JP 11170949 A * 6/1999

*Primary Examiner* — Barry Gooden, Jr.
(74) *Attorney, Agent, or Firm* — Tarolli, Sundheim, Covell & Tummino LLP (57) ABSTRACT

A seat belt system (20) includes a manifold assembly (60) having an inner housing (68) and an outer housing (70) which extends at least part way around the inner housing. One of the housings (68 or 70) is movable relative to a vehicle with a portion of the seat belt system. The other housing is connected with a source (54) of inflation fluid. In one specific embodiment of the invention, inner and outer housings (68 and 70) of the manifold assembly (60) extend around a portion of an anchor (36) for a seat belt (40). In this embodiment, the housings (68 and 70) have arcuate configurations and have axes which are coincident with a central axis (84) of the anchor (36). In addition to being pivotal relative to each other, the housings (68 and 70) may be movable transversely to each other. A seal (136) may be provided between the housings.

19 Claims, 8 Drawing Sheets

(56) References Cited

U.S. PATENT DOCUMENTS

2011/0068565 A1* 3/2011 Arnold et al. ................ 280/733

2012/0319386 A1* 12/2012 Bahr .................... B60R 21/268
280/733

* cited by examiner

SEAT BELT SYSTEM

BACKGROUND OF THE INVENTION

The present invention relates to a seat belt system having a seat belt which is connected with a vehicle and an inflatable component.

Seat belt systems used with inflatable components are known. The inflatable component is inflated by inflation fluid from a source of inflation fluid. The inflation fluid may be conducted from the source of inflation fluid through a buckle and a tongue of the seat belt system to the inflatable component. Known seat belt systems are disclosed in U.S. Pat. Nos. 3,791,670; 6,471,243; and 6,533,315.

SUMMARY OF THE INVENTION

The present invention relates to a seat belt system having a seat belt which is connected with a vehicle and an inflatable component. Inflation fluid is supplied to the inflatable component through a manifold assembly. The manifold assembly forms part of the seat belt system and includes a housing which is movable with a portion of the seat belt system relative to the vehicle. Another manifold housing is connected with a source of inflation fluid and with the vehicle.

A first one of the manifold housings may have an arcuate configuration and may extend around a portion of a seat belt anchor. A second one of the manifold housings may also have an arcuate configuration and may extend around the anchor. The second housing may have a central axis which is coincident with the central axis of the anchor and with the central axis of the first housing. The housings have openings through which inflation fluid from a source of inflation fluid flows upon inflation of the inflatable component.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF SPECIFIC EMBODIMENTS OF THE INVENTION

Figure 1:
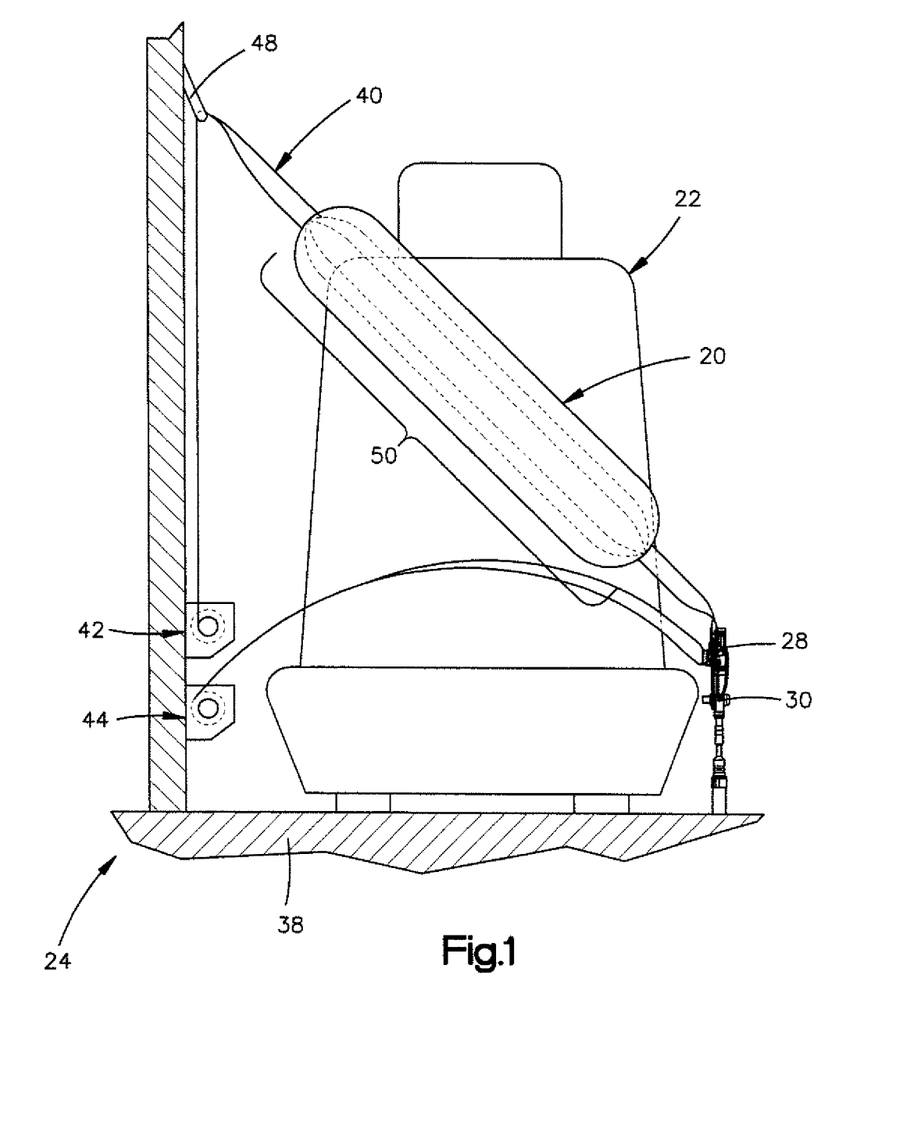
FIG. 1 is a schematic illustration of a seat belt system having a seat belt which is connected with a vehicle and an inflatable component.

A seat belt system 20, constructed in accordance with the present invention, is illustrated schematically in FIG. 1 in association with a seat 22 of a vehicle 24. After an occupant (not shown) of the vehicle 24 sits in the seat 22, the occupant connects a tongue 28 with a buckle 30. A connector 34 (FIG. 2) connects the seat belt system 20 with an anchor 36 (FIG. 3). The anchor 36 is a pin or bolt. However, the anchor 36 may have a different construction if desired.

The seat belt system 20 is of the known three-point continuous loop type and protects an occupant of the seat 22. The seat belt system 20 includes a seat belt 40 having one end portion connected with a torso belt retractor 42 mounted on the body 38 of the vehicle 34. The opposite end of the seat belt 40 is connected with a lap belt retractor 44 which is also mounted on the body 38 of the vehicle. One or more of the retractors may be eliminated if desired.

The seat belt 40 extends from the torso belt retractor 42 upwardly through a D-ring or turning loop 48 mounted on the body 38 of the vehicle. The seat belt extends downward and toward the right (as viewed in FIG. 1) and passes through the tongue 28. The seat belt extends from the tongue 28 to the lap belt retractor 44.

An inflatable component 50 is connected with the seat belt system 20. The inflatable component 50 is disposed between the tongue 28 and D-ring 48 and extends across the torso of an occupant of the seat. In the embodiment of the seat belt system 20 illustrated in FIG. 1, a slack portion of the seat belt 40 is connected with opposite ends of the inflatable component 50. The slack portion of the seat belt 40 prevents the application of excessive loads to the inflatable component 50 in the event of an accident in which the seat belt system 20 is used to help protect the occupant of the vehicle seat 22. The inflatable component 50 may be connected with the seat belt system 20 and/or a portion of the vehicle 24 in a different manner if desired.

In the event of an accident, an inflation fluid source 54 (FIGS. 2, 3 and 4) is activated. Upon activation of the inflation fluid source 54, a flow of inflation fluid is conducted from the source of inflation fluid to the seat belt system 20. The flow of inflation fluid is conducted through the seat belt system 20 to the inflatable component 50. The source 54 of inflation fluid may be a gas generator or a container of gas under pressure.

Force is transmitted from a passenger in the vehicle 24 through the inflatable component 50 to the seat belt 40 in the seat belt system 20. This force is transmitted through the tongue 28, buckle 30 and connector 34 in the seat belt system 20 to the anchor 36.

Figure 2:
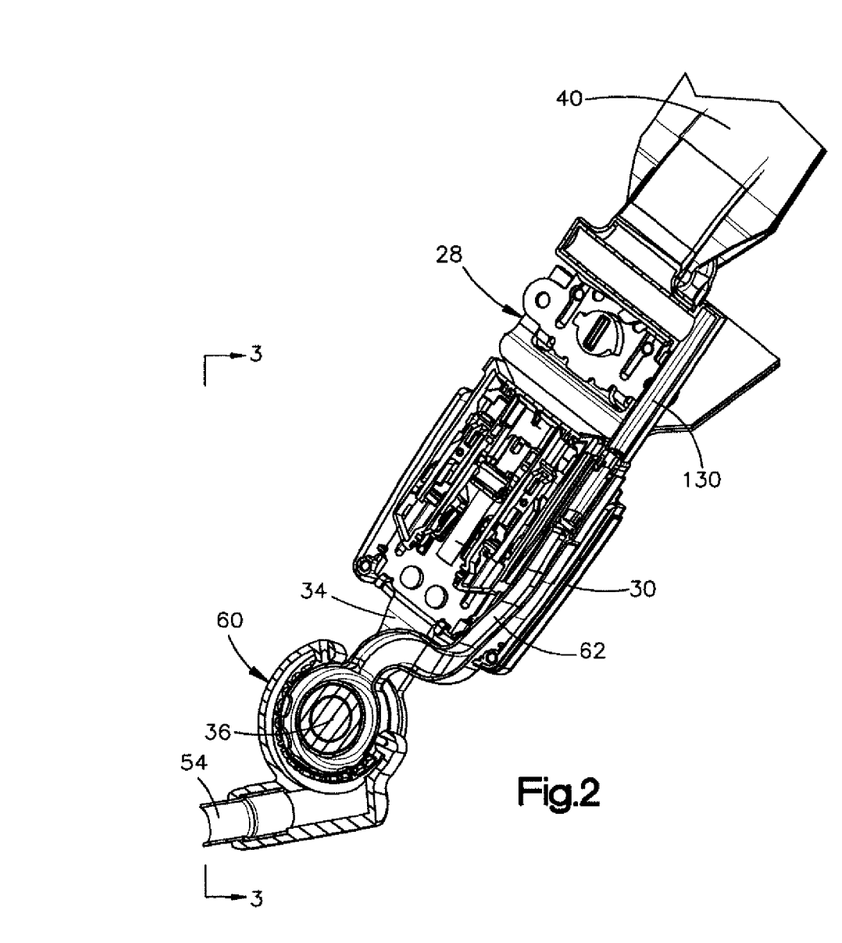
FIG. 2 is a fragmentary sectional view illustrating the relationship of a manifold assembly, buckle, and tongue in the seat belt system of FIG. 1 to a seat belt anchor.
Figure 3:
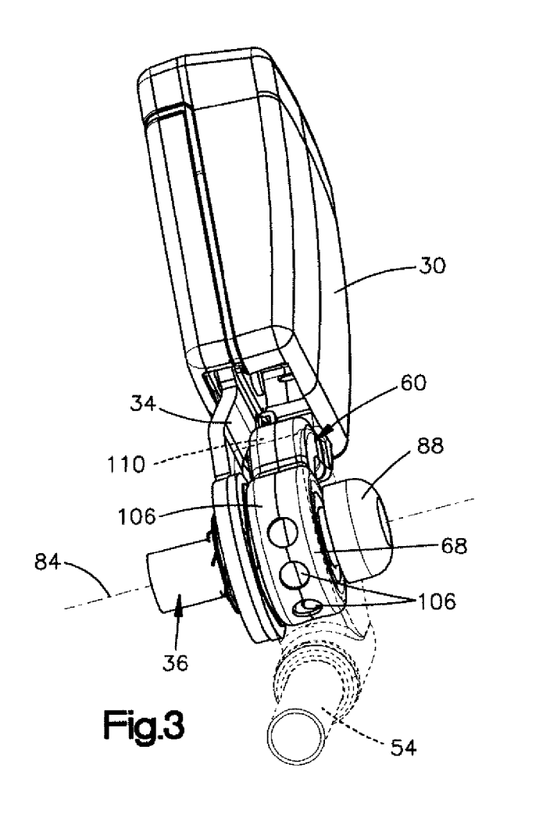
FIG. 3 is a side elevational view, taken generally along the line 3-3 of FIG. 2, further illustrating the relationship of an inner housing of the manifold assembly and the buckle in the seat belt system to the anchor.
Figure 4:
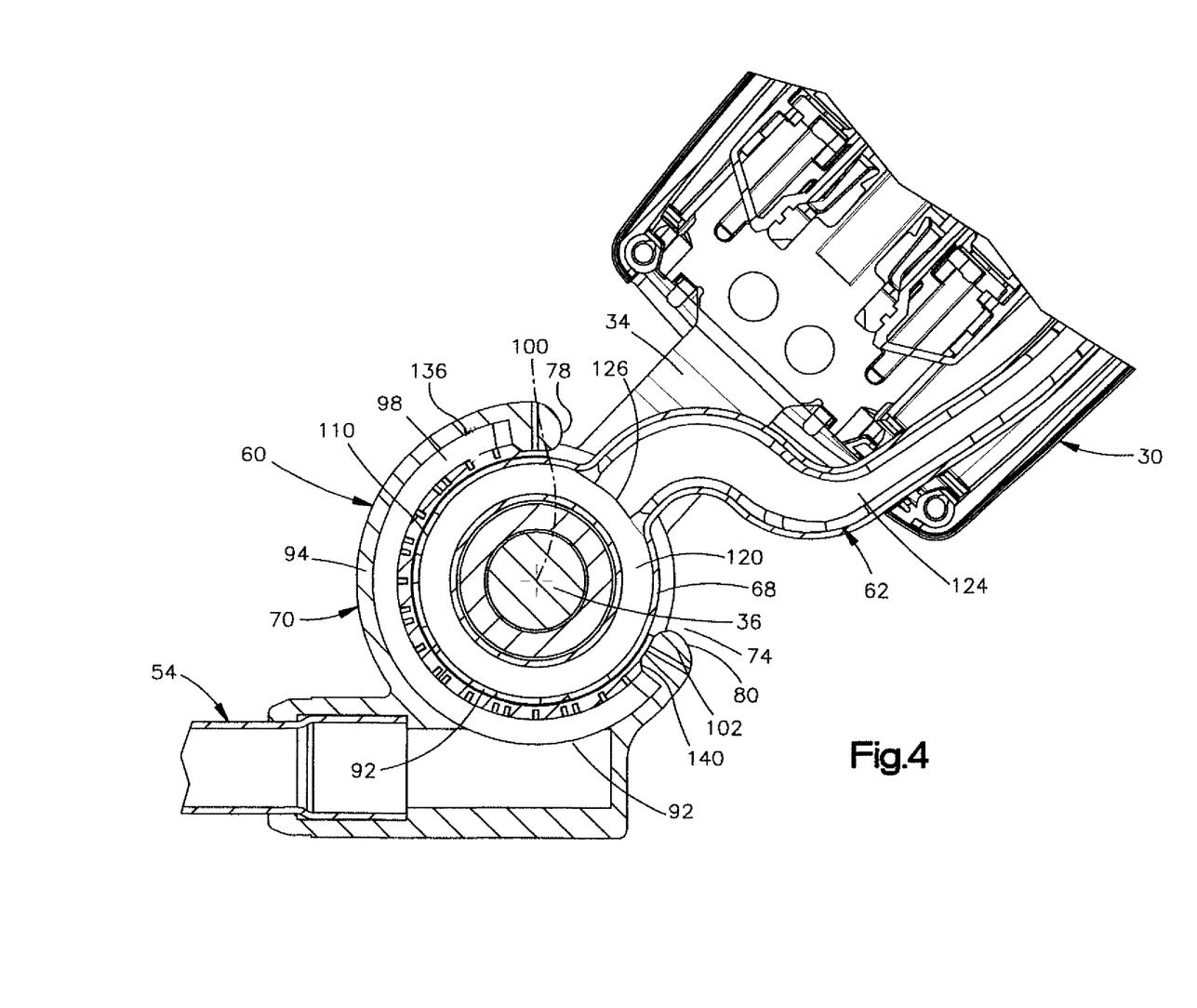
FIG. 4 is an enlarged schematic sectional view illustrating the manner in which inflation fluid is conducted from an inflation fluid source to the manifold assembly and a conduit connected with the inflatable component, the buckle being shown in a first position relative to the anchor.

In accordance with one of the features of the present invention, the seat belt system 20 includes a manifold assembly 60 (FIGS. 2, 3 and 4). Inflation fluid is conducted from the source 54 (FIG. 2) of inflation fluid to the inflatable component 50 (FIG. 1) through the manifold assembly 60. The manifold assembly 60 is connected in fluid communication with the inflatable component 50 through a conduit 62 (FIGS. 3 and 4). The conduit 62 extends through the buckle 30. This enables inflation fluid to be conducted from the source 54 through the manifold assembly 60 and conduit 62 to inflate the inflatable component 50 when the inflatable component is to be utilized to protect an occupant of the seat 22 (FIG. 1).

In the illustrated embodiment of the invention, only a single inflatable component 50 is provided. However, if desired, a plurality of inflatable components 50 may be utilized. If desired, one or more inflatable components 50 may be connected with a portion of the vehicle rather than to the seat belt 40. For example, the manifold assembly 60 may be utilized to conduct inflation fluid which flows to an inflatable component 50 connected with the seat belt 40 and an inflatable component 50 connected with a vehicle seat 22. As another example, the manifold assembly 60 may be utilized to conduct inflation fluid to one or more inflatable components which are spaced from the seat belt 40.

The manifold assembly 60 enables fluid (gas) under pressure to be conducted from the source of inflation fluid 54 (FIG. 4) to the conduit 62. In addition, the manifold assembly 60 accommodates movement between the conduit 62 and inflation fluid source 54 in every direction, within predetermined limits. The inflation fluid source 54 may be fixedly connected to the body 38 of the vehicle 24 or other portion of the vehicle. The inflation fluid source 54 may be spaced from the seat belt system 20.

The manifold assembly 60 includes an inner manifold housing 68 and an outer manifold housing 70 (FIG. 4). The outer manifold housing 70 extends at least partway around the inner manifold housing 68. The outer manifold housing 70 is stationary relative to the anchor 36 and body 38 of the vehicle. The inner manifold housing 68 and outer manifold housing 70 both extend at least partway around the anchor 36. However, the manifold assembly 60 may be spaced from the anchor 36 if desired.

The inner manifold housing 68 is rotatable, through limited distances, in every direction relative to the outer manifold housing 70 and anchor 36. In addition, the buckle 30, connector 34, and conduit 62 are rotatable, through predetermined distances, relative to the outer manifold housing 70 and anchor 36. The inner manifold housing 68, conduit 62, buckle 30, and connector 34 (FIG. 4) all rotate together relative to the outer manifold housing 70 under the influence of force transmitted to the buckle 30. This force may be manually applied to the buckle 30 or may be transmitted through the seat belt 40 and tongue 28 to the buckle.

To accommodate relative movement between the inner manifold housing 68 and outer manifold housing 70, the inner and outer manifold housings 68 and 70 have a construction similar to a ball and socket joint. The outer manifold housing 70 cooperates with the inner manifold housing 68 in the same general manner as in which a socket cooperates with a ball of a ball and socket joint. It is contemplated that the inner and outer manifold housings 68 and 70 may be constructed in such a manner that the manifold assembly accommodates relative movement between the buckle 30 or other portion of the seat belt system 20, in a manner similar to a different type of joint. For example, the inner and outer manifold housings 68 and 70 may cooperate in the same general manner as components of a hinge joint. Alternatively, the manifold assembly 60 may be constructed so as to form a slip joint or a bellows joint. For example, one cylindrical tubular member may be telescopically positioned in another tubular member in such a manner as to accommodate axial and/or rotational movement between the tubular members.

In the embodiment of the manifold assembly 60 illustrated in FIG. 4, the inner manifold housing 68 has an annular configuration and extends around the anchor 36. The outer manifold housing 70 extends partway around the inner manifold housing 68. The outer manifold housing 70 forms an opening 74 through which the conduit 62 extends. The outer manifold housing 70 has stop surfaces 78 and 80 which cooperate with the conduit 62 to limit movement of the inner manifold housing 68 relative to the outer manifold housing 70.

The outer manifold housing 70 is stationary relative to the anchor 36 and body 38 of the vehicle 24. If desired, the outer manifold housing 70 may be mounted on a component of the vehicle 24 which is movable relative to the body 38. For example, the outer manifold housing 70 may be mounted on the seat of a vehicle.

When force is applied to the buckle 30, either manually or through the seat belt 40 and tongue 28, the buckle is pivoted about a longitudinal central axis 84 (FIG. 3) of the anchor 36. The annular inner manifold housing 68 has a central axis which, in some positions of the inner manifold housing relative to the outer manifold housing 70, is coincident with the central axis 84 of the anchor 36. The inner manifold housing 68 and connector 34 for the buckle 30 may be pivoted about the axis 84 in a clockwise direction from a first end portion of a range of rotational movement (FIG. 4) to a second end portion of the range of rotational movement (FIG. 5).

When the inner manifold housing 68 is at the first end portion of the range of rotational movement (FIG. 4), the stop surface 78 on the outer manifold housing 70 is adjacent to and may be engaged by the conduit 62 to limit counterclockwise (as viewed in FIG. 4) rotation of the connector 34 and inner manifold housing 68. Similarly, when the manifold housing is at the second end portion of the range of rotational movement (FIG. 5), the conduit 62 is adjacent and may be engaged by the stop surface 80 on the outer manifold housing 70. If desired, stop surfaces may be provided at locations other than between the conduit 62 and outer manifold housing 70. For example, stop surfaces may be connected with the body 38 of the vehicle 24 and/or the anchor 36.

During the pivotal movement of the inner manifold housing 68 from the first end portion of the range of rotational movement (FIG. 4) to the second end portion of the range of rotational movement (FIG. 5), the inner manifold housing 68 may be maintained in a coaxial relationship with the outer manifold housing 70 and anchor 36. When this is done, there will be no sideways or tilting movement of the conduit 62 and inner manifold housing 68 relative to the outer manifold housing 70 and anchor 36. This would result in just rotational movement about the axis 84 (FIG. 3) of the anchor 36.

Figure 5:
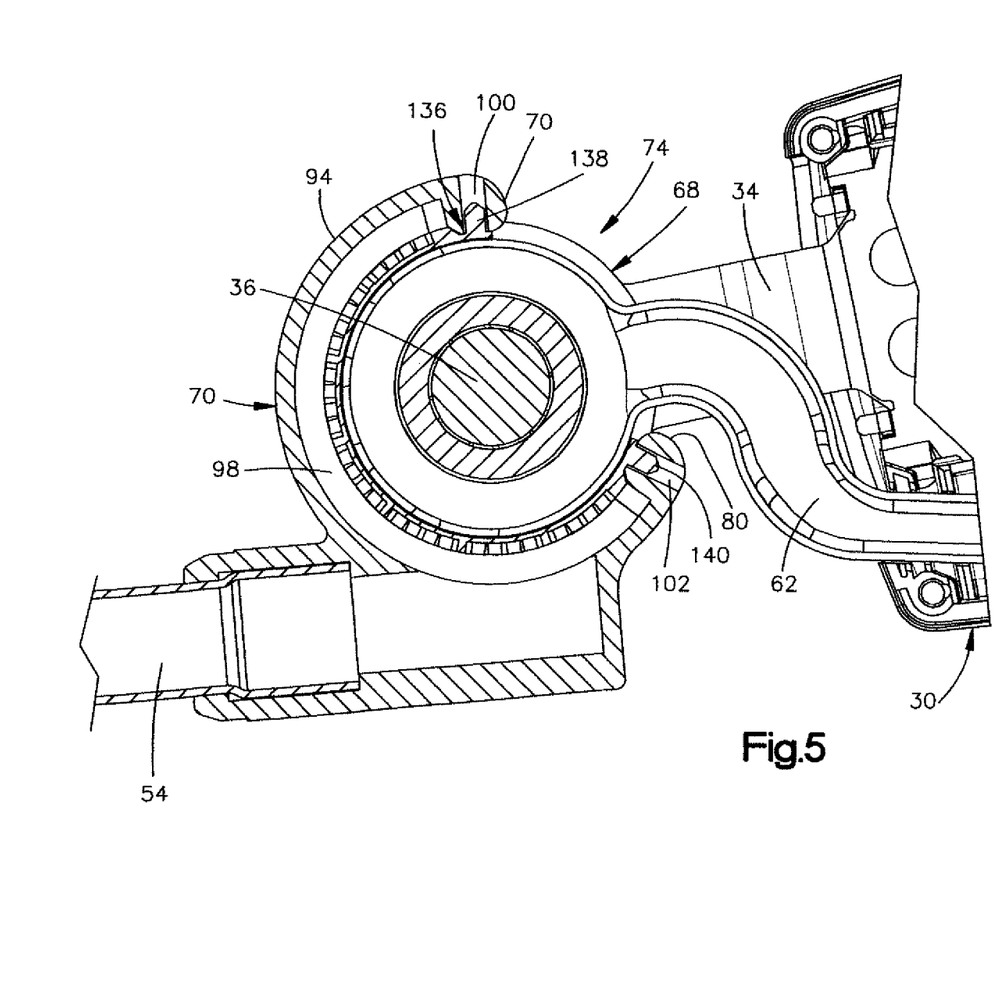
FIG. 5 is a fragmentary sectional view, generally similar to FIG. 4, illustrating the buckle in a second position relative to the anchor.

In the foregoing pivotal movement of the inner manifold housing 68 relative to the outer manifold housing 70, between the positions illustrated in FIGS. 4 and 5, there may be no sideways tilting or pivoting movement of the conduit 62 and buckle 30 relative to the anchor 36. Thus, the central axis of the buckle 30 and connector 34 may remain in the spatial relationship illustrated in FIG. 3 relative to the central axis 84 of the anchor 36. At this time, the connector 34 extends perpendicular to the central axis 84 of the anchor 36. If desired, the inner and outer manifold housings 68 and 70 may be constructed so as to accommodate only pivotal movement, similar to a hinge joint.

However, it is contemplated that it may be desired to have the buckle 30 and connector 34 tilt or move sideways, that is, generally along the axis 84, relative to the anchor 36 under the influence of force manually applied to the buckle 30 or transmitted to the buckle through the seat belt 40. This tilt or sideways movement of the buckle 30 results in the buckle 30 and connector 34 being moved toward either the left or the right (as viewed in FIG. 3) relative to the anchor 36. It should be noted that the outer manifold housing 70 has been removed in the illustration of FIG. 3 to better illustrate the inner manifold housing 68.

As the buckle 30 and connector 34 tilt or move sideways, the connector 34 is resiliently deflected. The buckle 30 and connector 34 move from positions in which their central axes extend perpendicular to the central axis 84 of the anchor 36 to positions in which their central axes are skewed at acute angles relative to the central axis of the anchor. The buckle 30, connector 34 and inner manifold housing 68 all pivot sideways and/or rotate together about the anchor 36 while the outer manifold housing 70 remains stationary.

The conduit 62 (FIGS. 4 and 5) tilt or moves sideways, that is, generally along the axis 84, relative to the anchor 36, with the connector 34 and buckle 30. As the conduit 62, connector 34, and buckle 30 tilts or moves sideways, they stay in the same spatial relationship to each other. However, their central axes are pivoted toward either the left or right, as viewed in FIG. 3. Sideways movement of the connector 34 and inner manifold housing 68 relative to the anchor 36 may be limited by surfaces fixedly connected to the vehicle body 38 and/or anchor 36. It should be understood that the buckle 30, connector 34, and conduit 62 will probably be moved with a combined pivotal movement about the axis 84 of the anchor 36 and sideways movement relative to the anchor. When the buckle 30 has been moved sideways relative to the anchor 36, the buckle is urged back towards its initial orientation relative to the anchor by the resiliently deflected connector 34.

The anchor 36 has a circular head end portion 88 which is engaged by the right (as viewed in FIG. 3) side of the inner manifold housing 68 to limit rightward (as viewed in FIG. 3) tilting and movement of the buckle 30, connector 34, conduit 62, and inner manifold housing 68 relative to the anchor 36. Similarly, a stop member, such as a nut, may be fixedly connected to the anchor 36 adjacent to the connector 34 to limit leftward (as viewed in FIG. 3) sideways tilting movement of the buckle 30, connector 34, conduit 62, and inner manifold housing 68 relative to the anchor. Rather than limiting sideways tilting movement of the buckle 30, connector 34, and inner manifold housing 68 relative to the anchor 36 with stop surfaces which are fixedly connected to the anchor, stop surfaces may be connected to the body 38 of the vehicle and positioned to limit sideways movement of the buckle, connector, and inner manifold housing relative to the anchor. Of course a combination of stop surfaces connected with the body 38 and stop surfaces connected with the anchor 36 may be utilized to limit sideways movement of the buckle 30, connector 34, conduit 62, and inner manifold housing 68 relative to the anchor.

When the buckle 30 is moved with a combined rotational and tilting (sideways) movement, the buckle is simultaneously rotated about and tilted relative to the central axis 84 of the anchor 36. This results in the buckle 30 being moved from a first position to a second position in which the buckle is rotationally displaced about the central axis 84 of the anchor 36 from the first position. In addition, the buckle 30 is tilted relative to the central axis 84 of the anchor 36 as the buckle moves from the first position to the second position.

In addition to accommodating relative movement between one or more components of the seat belt system 20 and the vehicle body 38, the manifold assembly 30 conducts a flow of inflation fluid from the source 54 to the conduit 62 when the inflatable component 50 is to be inflated. The inflatable component 50 may have a construction and mode of operation similar to construction and mode of operation of an inflatable component disclosed in the aforementioned U.S. Pat. No. 6,533,315. Alternatively, the inflatable component 50 may have a construction similar to the construction of an inflatable component disclosed in U.S. Pat. No. 5,390,953.

Figures 6, 7:
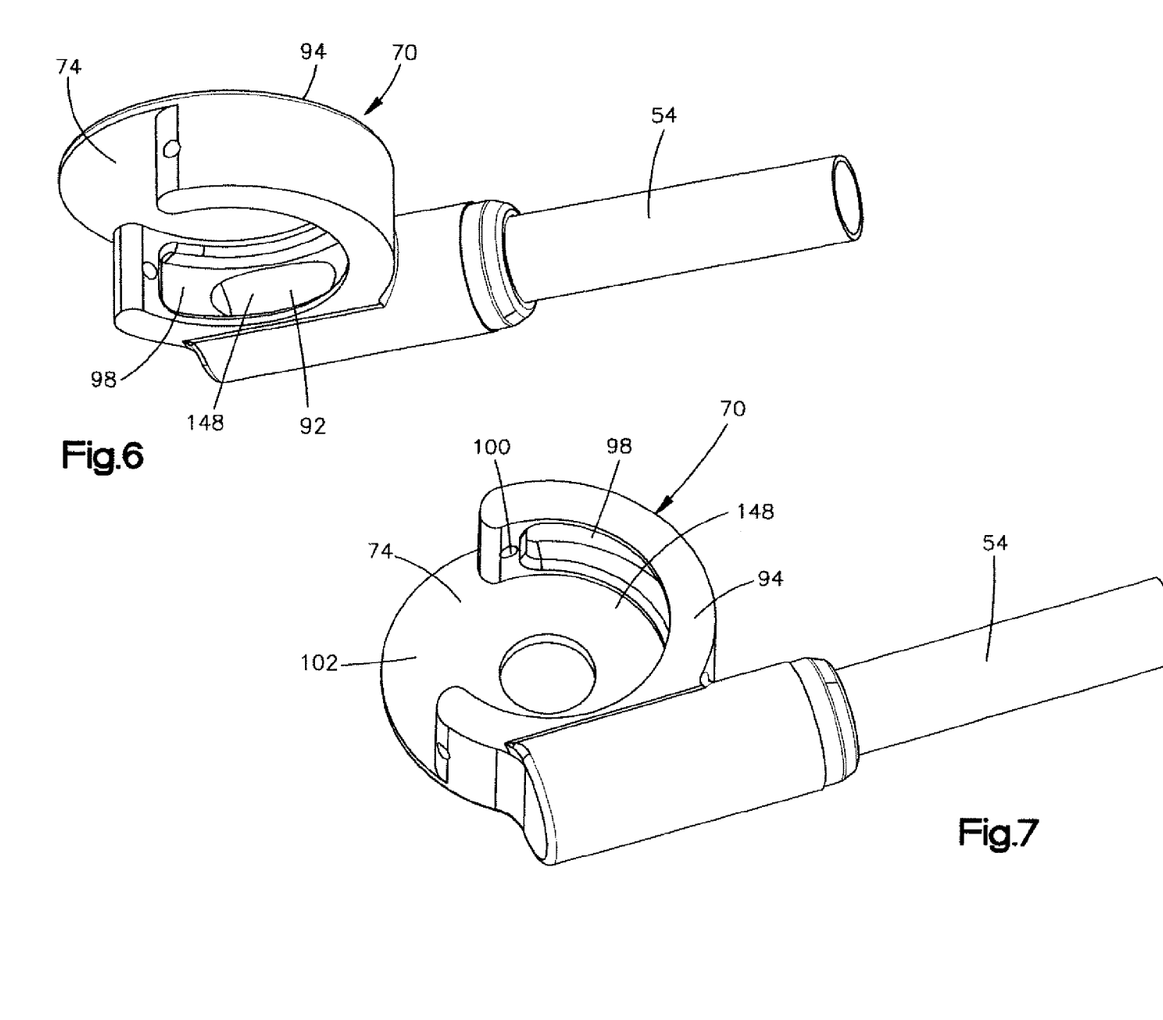
FIG. 6 is a pictorial illustration of an outer housing of the manifold assembly.
FIG. 7 is a pictorial illustration further illustrating the construction of the outer housing of the manifold assembly.

The outer manifold housing 70 (FIGS. 6 and 7) is connected in fluid communication with the source 54 (FIG. 4) of inflation fluid through an opening 92 (FIG. 6) formed in an outer side wall 94 of the outer manifold housing 70 (FIG. 6). The opening 92 connects a recess or groove 98 formed in the outer side wall 94 of the outer manifold housing 70 (FIGS. 6 and 7) in fluid communication with the source 54 of inflation fluid. The arcuate groove 98 extends between opposite end portions 100 and 102 of the outer side wall 94 (FIG. 5). The arcuate groove 98 extends for a major portion of the arcuate extent of the outer side wall 94. Thus, the groove 98 has an arcuate extent of more than 180° along the outer side wall 94.

Although the outer side wall 94 does not completely enclose the circular inner manifold housing 68 (FIGS. 4 and 5), the outer side wall 94 encloses approximately two hundred and sixty to two hundred and seventy degrees of the arcuate extent of the generally circular inner manifold housing 68. Of course, the arcuate extent of the outer side wall 94 of the outer manifold housing 70 may be either greater than or less than the arcuate extent of the outer manifold housing illustrated in FIGS. 4 and 5. The greater the arcuate extent of the outer side wall 94 of the outer manifold housing 70, the smaller would be the arcuate extent of the opening 74 and the range of pivotal movement of the inner manifold housing 68 and conduit 62 relative to the outer manifold housing 70 and anchor 36. Thus, the greater the arcuate extent of the outer side wall 94 of the outer manifold housing 70, the smaller will be the distance between the two stop surfaces 78 and 80 which limit arcuate movement of the inner manifold housing 68 and conduit 62 relative to the outer manifold housing 70.

An arcuate array of circular openings 106 (FIG. 3) is formed in circular outer side wall 110 of the inner manifold housing 68. The openings 106 in the outer side wall 110 of the inner manifold housing 68 are aligned with the recess or groove 98 (FIGS. 5, 6 and 7), formed in the outer side wall 94 of the outer manifold housing 70. The openings 106 in the outer side wall 110 of the inner manifold housing 68 are aligned with a portion of the groove 98 in the outer manifold housing 70 throughout the extent of arcuate movement of the inner manifold housing 68 relative to the outer manifold housing 70. When the inner manifold housing 68 is at the first end of its range of rotational movement (FIG. 4) and when the inner manifold housing 68 is at the second end of its range of rotational movement (FIG. 5), all of the openings 106 are exposed to the recess or groove 98.

It is contemplated that the arcuate array of circular openings 106 in the outer side wall 110 of the inner manifold housing 68 may be replaced by a single arcuate slot. If this was done, the single arcuate slot in the outer side wall 110 of the inner manifold housing 68 would have an arcuate extent which is less than the arcuate extent of the groove 98 in the outer manifold housing 70 (FIG. 5). The length of the groove 98 in the outer manifold housing 70 would exceed the length of the slot in the inner manifold housing 68 to have both end portions of the slot in the outer side wall 110 of the inner manifold housing 68 in alignment with the relatively long groove 98 in the outer manifold housing 70 throughout the range of arcuate movement of the inner manifold housing 68 relative to the outer manifold housing 70. Similarly, the groove 98 may be replaced with a plurality of openings which cooperate with a single arcuate slot or a plurality of openings in the outer side wall 110 of the inner manifold housing 68.

Figure 8:
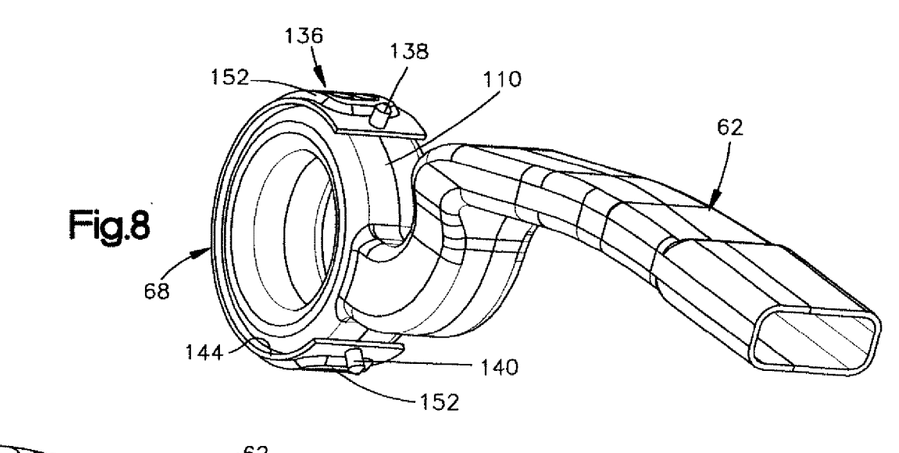
FIG. 8 is a schematic pictorial illustration depicting the relationship of an inner housing of the manifold assembly to a seal which forms part of the outer housing of the manifold assembly.
Figure 9:
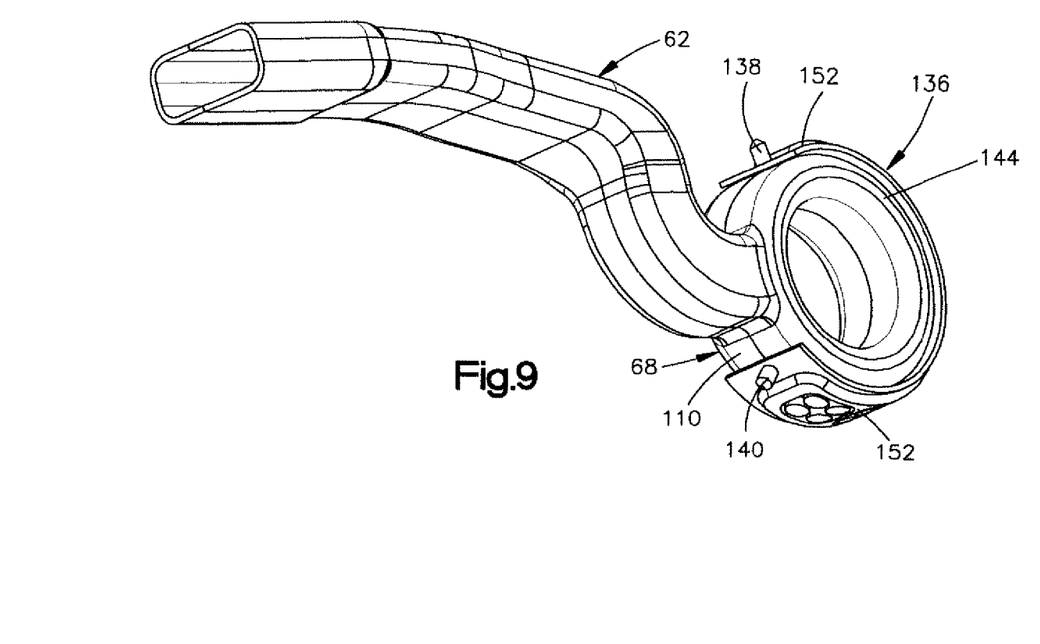
FIG. 9 is a schematic illustration further depicting the relationship of the inner housing of the manifold assembly to the seal which forms part of the outer housing of the manifold assembly.

The inner manifold housing 68 and conduit 62 are integrally formed as one piece (FIGS. 8 and 9). The conduit 62 is connected with the arcuate passage 120 (FIG. 4) formed in the inner manifold housing 68. The circular openings 106 (FIG. 3) enable inflation fluid to flow from the groove 98 (FIG. 4) in the outer side wall 94 of the outer manifold housing 70 into the passage 120 in the inner manifold housing 68. The passage 120 is connected in fluid communication with a passage 124 in the conduit 62 at an opening 126 (FIG. 4) in the inner manifold housing 68. The illustrated inner manifold housing 68 and conduit 62 are integrally formed as one piece of polymeric material. However, the inner manifold housing 68 and conduit 62 may be formed of metal if desired. In addition, it is contemplated that the inner manifold housing 68 and conduit 62 may be formed as a plurality of pieces.

The conduit 62 extends from the circular outer side wall 110 of the inner manifold housing 68 (FIGS. 8 and 9) through the buckle 30 (FIG. 2) to a conduit 130 (FIG. 2) connected with the tongue 28. The conduits 62 and 130 provide continuous flow path for inflation fluid through the buckle 30, along the tongue 28 and into the inflatable component 50 (FIG. 1). The manner in which the conduits 62 and 130 are connected to enable inflation fluid to flow into the inflatable component 50 is similar to the systems disclosed in the aforementioned U.S. Pat. Nos. 6,471,243 and 6,533,315. If desired, the inflatable component 50 may be located at a location spaced from the seat belt 40.

A seal 136 (FIGS. 8 and 9) is disposed between the inner and outer manifold housings 68 and 70 (FIGS. 4 and 5). The imperforate seal 136 has a plurality of projections 138 and 140 (FIGS. 8 and 9) which extend from the seal 136 and project into recesses formed in the outer manifold housing 70. The projections 138 and 140 hold the seal against movement relative to the outer manifold housing 70. When the source 54 of inflation fluid is activated, the seal 136 ruptures at the openings 106 in the inner manifold housing 68 to enable inflation fluid to flow from the outer manifold housing 70 into the inner manifold housing 68.

The seal 136 has an arcuate inner side surface 144 which is disposed in engagement with the outer side wall 110 of the inner manifold housing 68 (FIGS. 8 and 9). The inner side surface 144 of the seal 136 spans (extends across) the circular openings 106 (FIG. 3) formed in the outer side wall 110 of the inner manifold housing 68. There are no through openings in the seal 136. This enables the imperforate seal 136 to block entry of contaminates into the openings 106 formed in the outer side wall 110 of the inner manifold housing 68 to thereby block movement of contaminants into the passage 120 (FIG. 4) formed by the inner manifold housing and movement of contaminants into the conduit 62.

When the buckle 30 and connector 34 are moved relative to the body 38 (FIG. 1) of the vehicle 24, the inner manifold housing 68 moves with the connector 34 and buckle 30 (FIG. 4). In addition to blocking the entry of contaminants into the inner manifold housing 68, the seal 136 is formed of a polymeric material having a relatively low coefficient of friction to facilitate relative movement between the inner manifold housing 68 and the seal. Although the illustrated seal 136 is formed of a polymeric material, it is contemplated that the seal may be formed of a different material if desired. For example, the seal 136 may be formed of metal. If the seal 136 is formed of metal, it may be desired to provide a thin coating or film of material having a low coefficient of friction over the inner side surface 144 of the seal 136 to facilitate relative movement between the inner manifold housing 68 and the seal.

The seal 136 also blocks entry of contaminants into the recess or groove 98 formed in the outer manifold housing 70. The seal 138 spans or extends across an arcuate opening 148 to the groove 98. This enables the seal to completely block contaminants from entering the outer manifold housing 70. The imperforate seal 136 is ruptured under the influence of fluid pressure when the inflation fluid source 54 is activated.

The seal 136 is held against movement relative to the outer manifold housing 70 by engagement of the projections 138 and 140 (FIG. 8) on the seal with correspondingly configured recesses in the outer manifold housing 70 (FIGS. 4 and 5). In addition, the seal 136 is held against movement relative to the outer manifold housing by a continuous longitudinally extending bead or projection 152 (FIGS. 8 and 9). The bead or projection 152 is formed as a closed loop which extends the length of the seal 136. The bead or projection 152 is received in the opening 148 (FIG. 6) formed in the outer manifold housing 70 and cooperates with the peripheral surface of the opening 148 to hold the seal 136 against movement relative to the outer manifold housing 70.

The seal 136 may be formed with weakened areas or indentations which are enclosed within the bead or projection 152 and facilitate rupturing of the seal 136 under the influence of fluid pressure conducted from the source 54 of inflation fluid upon an activation of the source of inflation fluid. Indentations or weakened areas in the seal 136 cooperate with the circular openings 106 (FIG. 3) in the inner manifold housing 68 to enable the seal 136 to be quickly and easily ruptured at the openings 106 formed in the inner manifold housing 68 when the source 54 of inflation fluid is activated. If desired, the seal 136 may be provided with small through openings to facilitate rupturing of the seal. These through openings may be disposed in one or more arrays in an area or areas enclosed by the bead or projection 152.

In the embodiment of the invention illustrated in FIGS. 1-9, the seal 136 is provided between the stationary outer manifold housing 70 and the movable inner manifold housing 68. It is contemplated that the seal 136 may be fixedly connected to the inner manifold housing 68 rather than to the other manifold housing 70. It is also contemplated that the seal 136 may be omitted if desired.

In the embodiment of the invention illustrated in FIGS. 1-9, the outer manifold housing 70 (FIG. 4) is held against movement relative to the body 38 of the vehicle 24 (FIG. 1). The inner manifold housing 68 moves relative to the body 38 of the vehicle 24 with the buckle 30 and/or other movable components of the seat belt system 20. It is contemplated that the inner manifold housing 68 may be held against movement relative to the body 38 of the vehicle 24. If this is done, the outer manifold housing 70 would be connected with the conduit 62 and inflatable component 50. This would result in the inner manifold housing 68 remaining stationary, relative to the body 38 of the vehicle 24, and the outer manifold housing 70 moving, relative to the body 38 of the vehicle 24, with the buckle 30 and/or other components of the seat belt system 20.

Figure 10:
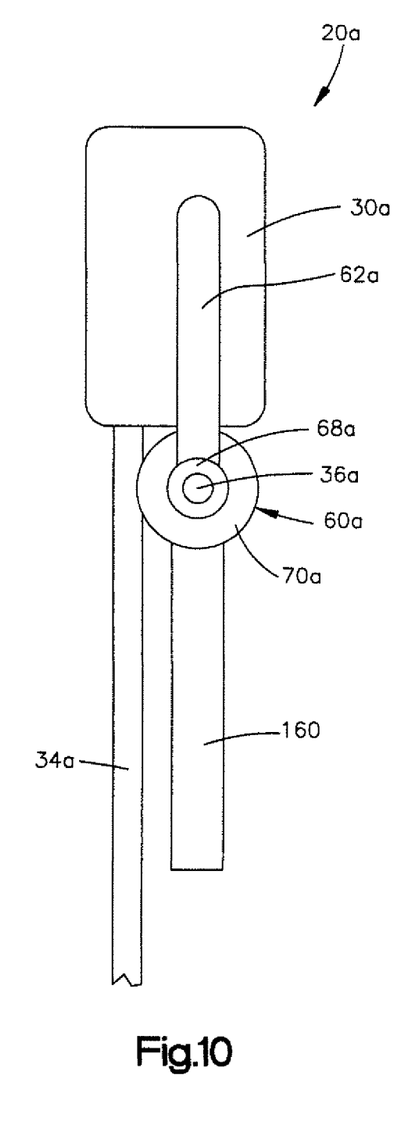
FIG. 10 is a schematic illustration of a second embodiment of the seat belt system with a buckle in a first orientation relative to a manifold assembly.
Figure 11:
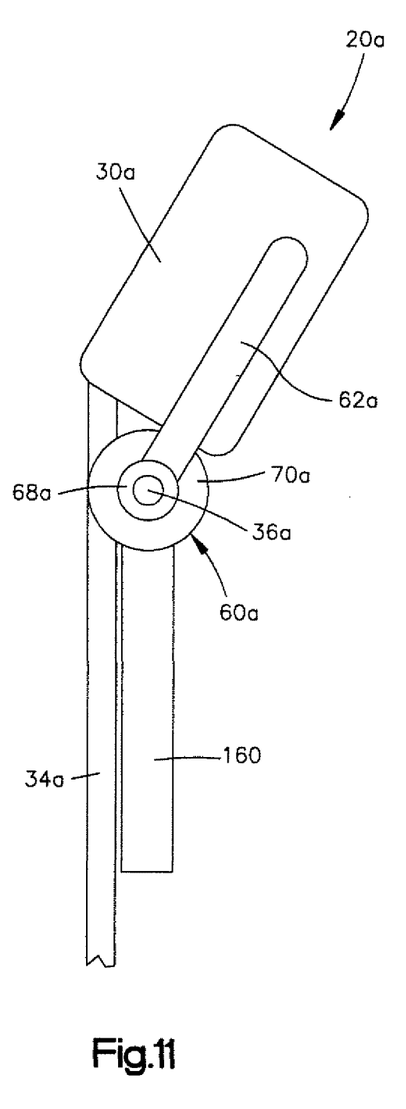
FIG. 11 is a schematic illustration, generally similar to FIG. 10, illustrating the buckle in a second orientation relative to the manifold assembly.

In the embodiment of the invention illustrated schematically in FIGS. 10 and 11, the outer manifold housing extends around the inner manifold housing. The inner manifold housing is connected with a source of inflation fluid while the outer manifold housing is connected with an inflatable component in the vehicle. Since the embodiment of the invention illustrated in FIGS. 10 and 11 is generally similar to the embodiment of the invention in FIGS. 1-9, similar numerals will be utilized to designate similar components, the suffix letter "a" being added to the numerals of FIGS. 10 and 11 to avoid confusion.

A seat belt safety system 20a includes a buckle 30a which is connectable with a tongue, corresponding to the tongue 28 of FIGS. 1 and 2. The buckle 30a is connected with an anchor 36a. The buckle 30a is movable between the upright orientation illustrated in FIG. 10 and the titled orientation illustrated in FIG. 11. The anchor 36a may be any desired support member, such as a seat support member. A connector (not shown), corresponding to the connector 34 of FIGS. 2-4, may be use to connect the buckle 30a with the anchor 36a.

The buckle 30a is connected in fluid communication with a source of inflation fluid (not shown), corresponding to the source 54 (FIG. 4) of inflation fluid, by a conduit 160 (FIG. 10). The conduit 160 is connected in communication with an inner manifold housing 68a. The inner manifold housing 68a is at least partially enclosed by an outer manifold housing 70a. The outer manifold housing 70a is connected in fluid communication with a conduit 62a. The conduit 62a extends from the outer manifold housing 70a into the buckle 30a. A conduit connected with a tongue and corresponding to the conduit 130 of FIG. 2, is connected in fluid communication with the conduit 62a when the tongue and buckle 30a are interconnected.

The inner and outer manifold housings 68a and 70a cooperate with each other to form a manifold assembly 60a. The inner manifold housing 68a may have an array of openings, corresponding to the openings 106 in the inner manifold housing 68 of FIG. 3. Similarly, the outer manifold housing 70a may have a slot or opening corresponding to the opening 148 on the outer manifold housing 70 (FIG. 6). A seal, corresponding to the seal 136 of FIGS. 8 and 9 may be utilized in conjunction with the inner and outer manifold housings 68a and 70a.

Although the manifold assembly 60a has been illustrated in FIGS. 10 and 11 in association with the buckle 30a, it is contemplated that the manifold assembly 60a may be associated with a different component of a seat belt system if desired. For example, the manifold assembly 60a may be associated with a tongue rather than the buckle 30a. As another example, the manifold assembly 60a may be associated with a D-ring, similar to the D-ring 48 of FIG. 1.

Figure 12:
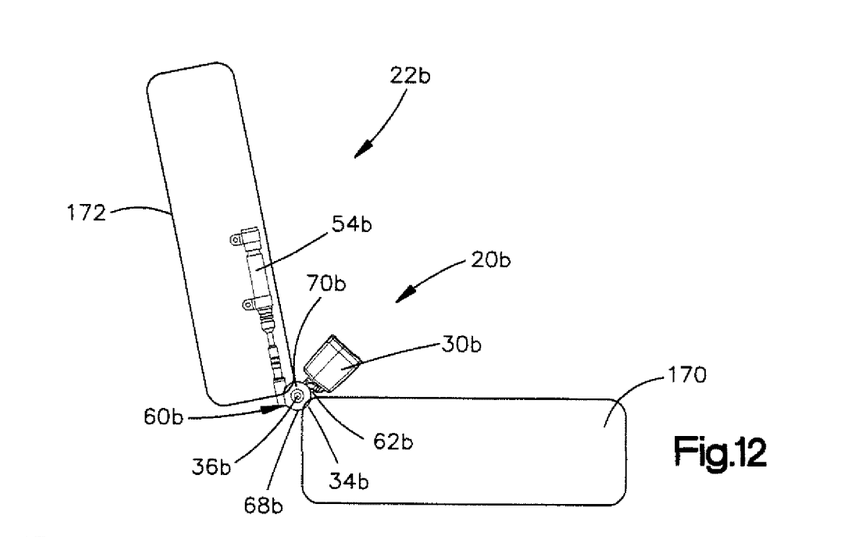
FIG. 12 is a schematic illustration of a seat belt system constructed in accordance with the present invention in association with a seat of a vehicle, a back of the seat being illustrated in an upright position.
Figure 13:
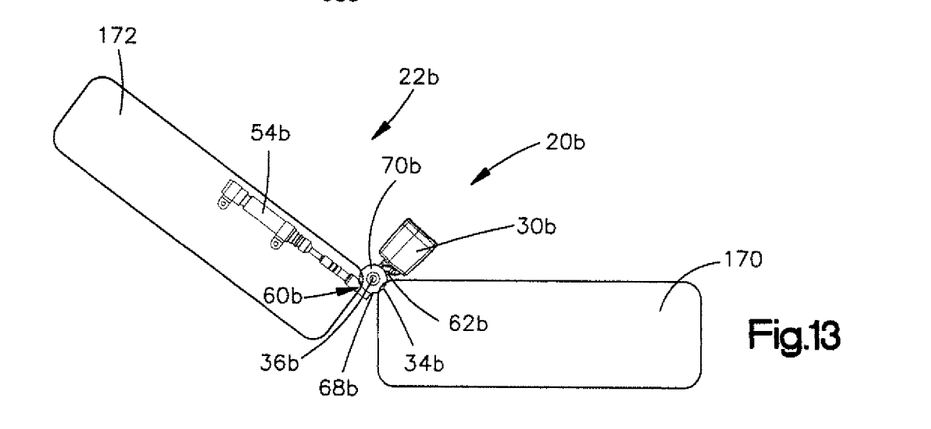
FIG. 13 is a schematic illustration, generally similar to FIG. 12, illustrating the seat of the vehicle with the back of the seat in a reclining position.
Figure 14:
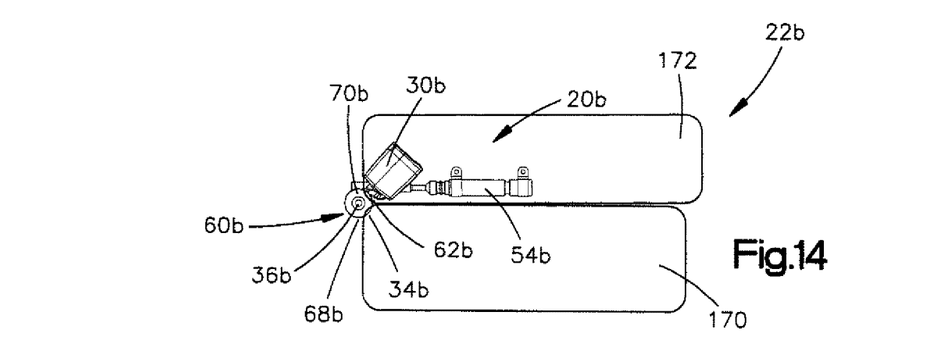
FIG. 14 is a schematic illustration of the vehicle seat of FIGS. 12 and 13 with the seat in a stored position.

In the embodiment of the invention illustrated in FIGS. 12-14, the manifold assembly is associated with the seat belt system which is at least partially mounted on the seat of a vehicle. Since the embodiment of the invention illustrated in FIGS. 12-14 is generally similar to the embodiments of the invention illustrated in FIGS. 1-11, similar numerals will be utilized to identify similar components, the suffix letter "b" being associated with the numerals of FIGS. 12-14 to avoid confusion.

A seat belt system 20b (FIGS. 12-14) is associated with a vehicle seat 22b. The vehicle seat 22b includes a seat bottom 170 which is connected with a body of a vehicle. A vehicle seat back 172 is pivotally connected to the seat bottom 170 at a support member 36b. The support member 36b is a hinge pin. Alternatively, the support member 36b may be a rod which extends across the seat in a direction generally perpendicular to a longitudinal axis of a vehicle in which the seat 22b is disposed.

A buckle 30b is connected with the support member 36b by a connector 34b. The connector 34b may be connected with the support member 36b in the same manner as in which the connector 34 of FIG. 3 is connected with the anchor 36. Alternatively, the connector 34b may be connected with a separate support member which is connected with the seat bottom 170. However, it is believed that it may be desired to have the connector 34b connected with the support member 36b by a flange or tab which interconnects the connector 34b and the support member 36b.

A source 54b of inflation fluid is disposed in the seat back 172. The source 54b of inflation fluid is connected with the buckle 30b by a manifold assembly 60b. The manifold 60b includes an outer manifold housing 70b which is connected with the buckle 30b by a conduit 62b. The inflation fluid source 54b is connected with an inner manifold housing 68b. The inner manifold housing 68b may be provided with a plurality of openings, corresponding to the circular openings 106 in the inner manifold housing 68 of FIG. 3. The outer manifold housing 70b may be provided with an arcuate recess or groove corresponding to the arcuate recess or groove 98 in the outer manifold housing 70 (FIGS. 6 and 7).

Upon activation of the inflation fluid source 54b, fluid flows from the inflation fluid source through the inner manifold housing 68b to the outer manifold housing 70b. The inflation fluid flows from the outer manifold housing 70b through the conduit 62b to the buckle 30b. A tongue connected with a buckle 30b, has a conduit which is connected with the conduit 62b in the same manner in which the conduit 130 of the tongue 28 is connected with the conduit 62 in FIG. 2. This enables fluid to flow from the outer manifold housing 70b through the conduit 62b and the conduit connected with the tongue to an inflatable component of the seat belt system 20b. If desired, a seal, corresponding to the seal 136 in FIGS. 8 and 9 may be provided between the inner and outer manifold housings 68b and 70b.

The seat back 172 is movable between the upright position illustrated in FIG. 12 and the reclining position shown in FIG. 13. In addition, the seat back 12 may be moved from either the upright position of FIG. 12 or the reclining position of FIG. 13 to the stowed position of FIG. 14. During pivotal movement of the seat back 172 between the upright, reclined and stowed positions of FIGS. 12-14, the inner manifold housing 68b rotates with the seat back 172 relative to the body of the vehicle in which the seat 22b is disposed.

The openings in the inner and outer manifold housings 68b and 70b enable inflation fluid to be conducted from the source 54b to the buckle 30b when the seat back 172 is either in the upright position of FIG. 12 or the inclined position of FIG. 13 or any position between these two positions. If desired, the openings in the inner and outer manifold housings 68b and 70b may cooperate in such a manner as to enable inflation fluid to be conducted from the inflation fluid source 54b through the manifold assembly 60b to the buckle 30b when the seat back 172 is in the stowed position of FIG. 14. However, it is believed that it may not be desired to have inflation fluid conducted to the inflatable component when the seat back 172 is in the stowed position of FIG. 14.

In view of the foregoing description, it is apparent that the present invention provides a seat belt system 20 having a seat belt 40 which is connected with a vehicle 24 and an inflatable component 50. Inflation fluid is supplied to the inflatable component 50 through a manifold assembly 60. The manifold assembly 60 includes a housing 68 which is movable with a portion of the seat belt system 20 relative to the vehicle 24. Another housing 70 is connected with a source 54 of inflation fluid and with the vehicle.

A first one of the housings 68 or 70 may have an arcuate configuration and extend around a portion of a seat belt anchor 36. A second one of the housings 68 or 70 may also have an arcuate configuration and may extend around the anchor 36. The second housing may have a central axis which is coincident with the central axis 84 of the anchor 36 and with the central axis of the first housing. The housings 68 and 70 have openings 106 and 148 through which inflation fluid from a source 54 of inflation fluid flows upon inflation of the inflatable component 50.

Having described the invention, the following is claimed:

1. A seat belt system having a seat belt which is connected with a vehicle and an inflatable component, said seat belt system comprising:
a manifold assembly which includes a first housing and a second housing which extends at least part way around said first housing, said first and second housings having openings and annular passages with coincident centers of curvature through which inflation fluid flows upon inflation of said inflatable component,
one of said housings being movable with a portion of said seat belt system relative to the vehicle, and
another of said housings being connected with a source of inflation fluid and with the vehicle.

2. A seat belt system as set forth in claim 1 wherein said first and second housings extend at least part way around an anchor that connects the seat belt system to the vehicle.

3. A seat belt system as set forth in claim 1 wherein said another housing of said first and second housings is fixedly connected with the source of inflation fluid and with the vehicle by an anchor for said seat belt.

4. A seat bait system as set forth in claim 1 wherein said one of said first and second housings has an arcuate side wall which is disposed in engagement with and is movable along an arcuate side wall of said another of said housings, said openings in said one of said housings being disposed in said arcuate side wall of said one of said housings, said openings in said another of said housings being disposed in said arcuate side wall of said another of said housings.

5. A seat belt system as set forth in claim 1 wherein said one of said housings if pivotal about an axis which is coincident with a central axis of an anchor member connected with the vehicle.

6. A seat belt system as set forth in claim 1 wherein said another housing of said first and second housings includes stop surfaces which are engagable by said one housing of said first and second housings to limit movement of said one housing relative to said another housing.

7. A seat bell system as set forth in claim 1 wherein said one of said housings extends at least part way around said another of said housings and is movable with said portion of said seat belt system relative to said another of said housings.

8. A seat belt system as set forth in claim 1 wherein said one of said housings extends at least part way around and is slidable along an outer side of said another of said housings, said one of said housings is movable with said portion of said seat belt system relative to said another of said housings.

9. A seat belt system as set forth in claim 1, further comprising:
an anchor that connects the seat belt system to the vehicle, said first and second housings extending at least part way around said anchor, and
a connector member that connects the seat belt system with said anchor, force being transmitted between the seat belt system and said anchor via only said connector member.

10. A seat belt system as set forth in claim 1 wherein said second housing includes a seal which slidably engages said first housing to accommodate relative movement between said first and second housings upon movement of said one of said first and second housings with the portion of the seat belt system.

11. A seat belt system as set forth in claim 10 wherein the source of inflation fluid is operable between an inactive condition in which the source of inflation fluid is ineffective to supply said inflation fluid to inflate the inflatable component and an active condition in which the source of inflation fluid is effective to supply said inflation fluid to inflate the inflatable component, said seal being ruptured under an influence of fluid pressure conducted from the source of inflation fluid when said source of inflation fluid is in the active condition.

12. A seat belt system as set forth in claim 1 further comprising an anchor that connects the seat belt system to the vehicle,
the annular passages extending around a portion of the anchor, and
a connector member which connects the seat belt with the anchor when the seat belt is secured across a portion of an occupant of the vehicle,
said first housing being connected with the inflatable component of said seat belt system and extending around the portion of the anchor, said first housing having an arcuate configuration with a central axis which is coincident with a central axis of the portion of the anchor, and
said second housing being connected with said source of inflation fluid and extending around the portion of the anchor, said second housing having an arcuate configuration with a central axis which is coincident with the central axis of the portion of the anchor and with the central axis of said first housing.

13. A seat belt system as set forth in claim 12 wherein one of said first and second housings is pivotal about the respective central axis with the portion of said seat belt system and is pivotal about an axis which extends transverse to the central axis of another of said first and second housings with the portion of said seat belt system.

14. A seat belt system a set forth in claim 12 wherein said first housing has an arcuate outer side which is engaged by an arcuate inner side of said second housing, said first housing being connected with and being pivotal with the portion of said seat belt system about the central axis of the portion of the anchor, said second housing being secured against movement relative to the portion of the anchor.

15. A seat belt system as set forth in claim 12 wherein the source of inflation fluid is fixedly connected to a portion of a vehicle seat.

16. A seat belt system as set forth in claim 12 wherein said seat belt system is utilized in association with a vehicle seat having bottom and back cushion portions, one of the bottom and back cushion portions being pivotal relative to another of the bottom and back cushion portions, said one of said first and second housings being movable with said one of the bottom and back cushion portions relative to the other of the bottom and back cushion portions.

17. A seat belt system as set forth in claim 12 wherein one of said first and second housings is movable with a portion of said seat belt system relative to the anchor.

18. A seat belt system as set forth in claim 17 wherein one of said first and second housings is fixedly connected with the vehicle.

19. A seat belt system having a seat belt which is connected with a vehicle and an inflatable component, said seat belt system comprising:
a manifold assembly which includes a first housing and a second housing which extends at least part way around said first housing, said first and second housings having openings through which inflation fluid flows upon inflation of said inflatable component,
one of said housings being movable with a portion of said seat belt system relative to the vehicle,
another of said housings being connected with a source of inflation fluid and with the vehicle,
said one of said housings being pivotal relative to said another of said housings about an axis extending transverse to the central axis of the anchor member.

* * * * *

UNITED STATES PATENT AND TRADEMARK OFFICE
CERTIFICATE OF CORRECTION

PATENT NO. : 9,283,913 B2
APPLICATION NO. : 13/781833
DATED : March 15, 2016
INVENTOR(S) : Kenneth R. Johnson et al.

It is certified that error appears in the above-identified patent and that said Letters Patent is hereby corrected as shown below:

In the claims,

Column 11, claim 4, line 1, reads "A seat bait" should read --A seat belt--

Column 11, claim 5, line 2, reads "said housings if pivotal" should read --said housings is pivotal--

Column 12, claim 13, line 3, reads "central axis with the portion of said seat belt" should read --central axis with a portion of said seat belt--

Column 12, claim 13, line 5, reads "axis of another of said first and second housings with the" should read --axis of another of said first and second housings with a--

Column 12, claim 14, line 4, reads "being connected with and being pivotal with the portion" should read --being connected with and being pivotal with a portion--

Signed and Sealed this
Twenty-first Day of June, 2016

Michelle K. Lee
*Director of the United States Patent and Trademark Office*